United States Patent [19]
Yuasa et al.

[11] 4,389,118
[45] Jun. 21, 1983

[54] COLOR METER

[75] Inventors: Yoshio Yuasa, Kawachinagano; Norio Ishikawa, Osaka; Izumi Horie, Toyohashi, all of Japan

[73] Assignee: Minolta Camera Kabushiki Kaisha, Azuchi, Japan

[21] Appl. No.: 210,398

[22] Filed: Nov. 25, 1980

[30] Foreign Application Priority Data

Nov. 28, 1979 [JP] Japan .................................. 54-154753

[51] Int. Cl.[3] .............................................. G01J 3/50
[52] U.S. Cl. ..................... 356/404; 356/406; 364/526
[58] Field of Search ............... 356/404, 406, 407, 416; 364/526; 355/38; 250/226; 354/58

[56] References Cited
U.S. PATENT DOCUMENTS

| | | | |
|---|---|---|---|
| 2,917,969 | 12/1959 | Stimm | 356/407 |
| 3,180,209 | 4/1965 | Crandell | 356/404 |
| 3,452,658 | 7/1969 | Krull et al. | 354/58 |
| 3,761,183 | 9/1973 | Yuasa et al. | 356/404 |
| 4,205,918 | 6/1980 | Kisanuki et al. | 356/404 |

*Primary Examiner*—F. L. Evans
*Attorney, Agent, or Firm*—Jackson, Jones & Price

[57] ABSTRACT

A color meter for measuring the respective intensity of the blue, green and red regions of an illuminating light source to provide the photographic information according to the measured value. The present invention provides an appliance, which directly provides, as the final output, the light balancing factor or the color compensating factor according to the necessary one from among the measured informations of the light intensity of each region of blue, green, red and an information determined according to using film, video image pickup tube, solid image pickup element, etc. and of which the operation is simple and the correcting filter can be simply and quickly determined.

16 Claims, 7 Drawing Figures

COLOR METER

BACKGROUND OF THE INVENTION

1. Field of the Invention

The present invention relates to a color meter which measures the respective intensity of the blue, green and red regions of an illuminating light source to provide photographic information according to the measured values.

2. Description of the Prior Art

A color meter is required to determine a color correcting filter, which can be used to compensate for the difference between the color balance of the illuminating light source and that of the film to be used. Color correcting filters, a LB filter and a CC filter which are respectively different in achieving correction can be used. The color correction is performed through the combination of the filters. Namely, the LB filter is used for compensating for the difference between the inclination of the entire color balance ranging from the red to the blue in the light source and the inclination of the corresponding entire color balance of the film to be used. Also, the CC filter is used to locally compensate the difference between the color balance of a specified color region with respect to the red in the light source and the corresponding color balance of the film to be used.

The conventional color meter measured and displayed the incident light intensity ratio (B-R ratio) of the blue region with respect to the red region in the light source and the incident light intensity ratio (G-R ratio) of the green region with respect to the red region. A photographer uses a calculation panel on the color meter or an accessory calculation panel and operates the dial on the calculation panel in accordance with the color temperature of the film and the B-R and G-R ratios read by the color meter. He reads the corresponding light balancing factor or the color compensating factor to determine the LB filter or the CC filter.

Therefore, the conventional color meter having such a construction as mentioned above was considered as an accessory for measuring and displaying the B-R ratio and G-R ratio, which were only indirect information in determining the LB filter or the CC filter, resulting in that the conventional color meter took more time to determine the correcting filter and was too complicated in use. Briefly described, according to the conventional color meter, the information measured was intermediate in determining the correcting filter. The B-R ratio and the G-R ratio reflects the measured information of the light intensity in each of the blue, green and red regions. The final output was a value, which had no direct information. The filter determination which is based on the film used must be calculated or determined by use of an accessory calculator panel.

SUMMARY OF THE INVENTION

Accordingly, the present invention provides an appliance, which directly provides, as the final output, the light balancing factor or the color compensating factor according to the necessary one from among the measured information of the light intensity of each region of blue, green, red and on information determined according to the film, video game image pickup tube, solid image pickup device, etc., used thereby to obtain a new type of color meter.

An object of the present invention is to provide a novel type of color meter wherein the operation is simple and the correcting filter can be simply and quickly determined.

Another object of the present invention is to provide a novel color meter which can directly display the light balancing factor or the color compensating factor with respect to the conventional color meter, which is known as an accessory which measures and displays the B-R ratio and the G-R ratio, whereby, according to the present invention, the determination of the color correcting filter can be made more quickly and easily than before, thus resulting in greater convenience for the photographing operation.

According to the present invention, there is provided a color meter comprising a first light measuring circuit for outputting a signal corresponding to the intensity of the incident light of a red region from among the incident light rays, a second light measuring circuit for outputting a signal corresponding to the intensity of the incident light of a green region, a third light measuring circuit for outputting a signal corresponding to the intensity of the incident light of a blue region, a setting apparatus for outputting a signal corresponding to the color temperature of a type of a film to be used, a processing circuit which can guide a light balancing factor and/or a color compensating factor according to a necessary signal from the signals from the first, second and third light measuring circuits and the signal from the setting apparatus, and a display apparatus which can display the light balancing factor or the color compensating factor according to the signal of the processing circuit.

These and other objects, features, aspects, and advantages of the present invention will become more apparent from the following detailed description of the present invention when taken in conjunction with the accompanying drawings, in which;

BRIEF DESCRIPTION OF THE DRAWINGS

FIG. 4-1 through FIG. 4-4 are flow charts of output signal showing the operation of the microcomputer employed in the second embodiment of FIG. 3.

DESCRIPTION OF THE PREFERRED EMBODIMENTS

Figure 1:
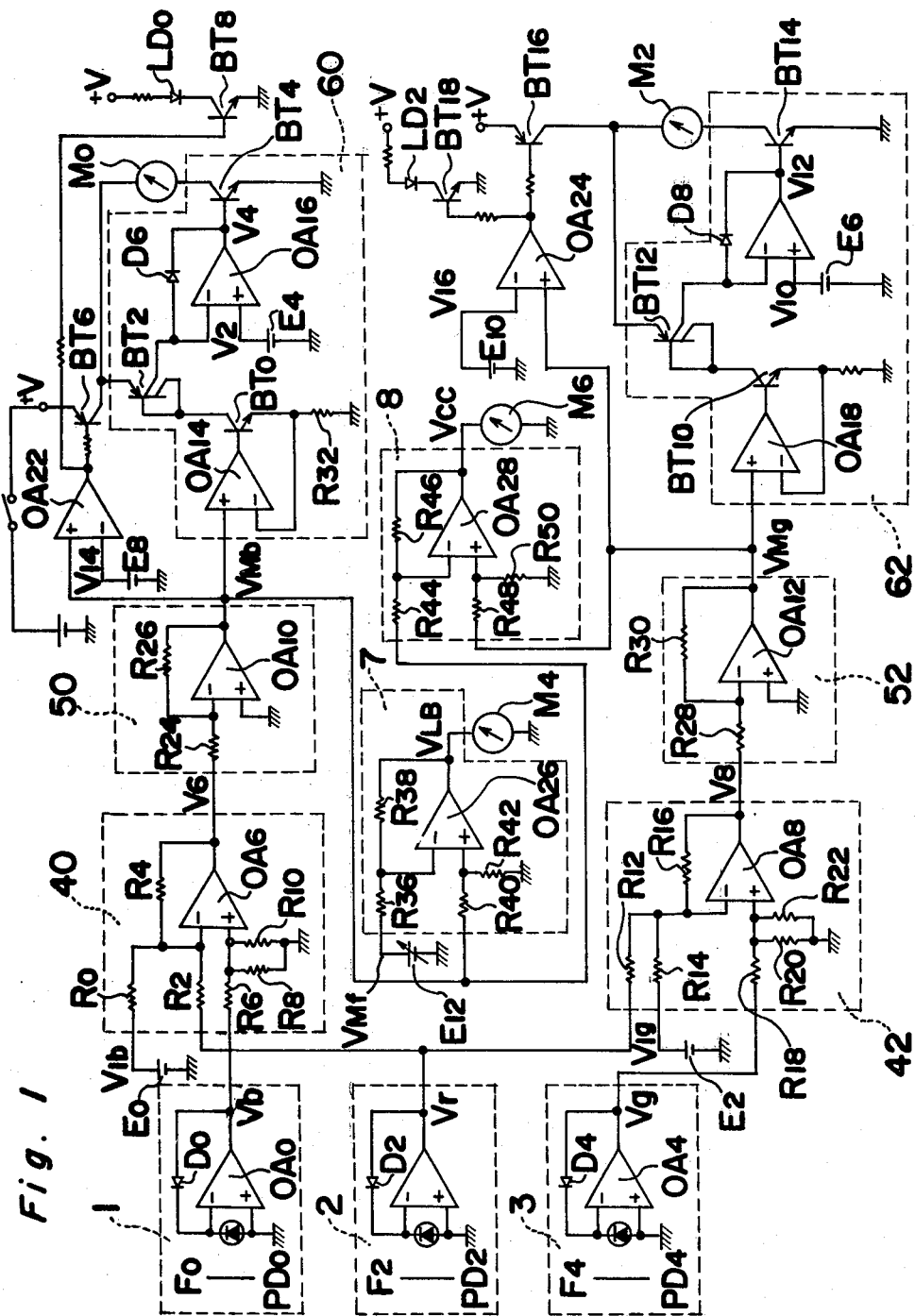
FIG. 1 is an electronic circuit diagram to be employed in a photographic color meter according to a first embodiment of the present invention.

The following embodiment of the present invention is constructed on the assumption of achieving color correction by the combination of an LB filter with a CC filter. Prior to the description of the embodiment, preliminary items about the color correction will be described hereinafter.

There is known the relationship of $$10^6/Tx = 1/K_2 \cdot \{1n(I_1/I_2) - K_1\} \quad (1)$$

between the light-ray intensity ($I_1$, $I_2$) of the operational two wavelengths ($\lambda_1$, $\lambda_2$) from a black body radiation and the photographic color temperature (Tx) Kelvin determined by the two-wavelength intensity in blackbody radiation. Here, $$K_1 = 5 \cdot \ln(\lambda 2/\lambda 1), \quad K_2 = (1/\lambda 2 - 1/\lambda 1) \cdot C$$

is given, wherein C is constant. Also, there is known to be represented $$Mx = 10^6/Tx$$

with Mrd as unit, the Mrd standing for Micro Reciprocal Degree.

In actual known measuring apparatus, for photographic color it is difficult to measure the light-ray intensity of one wave length only. Actually the output In of the measuring apparatus is as follows:

$$In = \int I \cdot Sn \cdot d\lambda$$

wherein Sn is the spectral sensitivity or response of the measuring apparatus. Also, the wavelength λn corresponding to the measuring apparatus is given as follows.

$$\lambda n = \int \lambda \cdot Sn \cdot d\lambda$$

The above-described relation is applied to the light-ray intensity Ib of the blue region in the light source and the lightray intensity Ir of the red region to give the following Mb. This Mb is called B-R ratio.

$$Mb = \frac{10^6}{Tb} = \frac{1}{K_{2b}} \cdot \left( \ln \frac{Ib}{Ir} - K_{1b} \right) \quad (1\text{-}1)$$

$$M_{1b} = 5 \cdot \ln \frac{\lambda r}{\lambda b}, \quad K_{2b} = \left( \frac{1}{\lambda r} - \frac{1}{\lambda b} \right) \cdot C$$

$$Ib = \int I \cdot Sb \cdot d\lambda, \quad Ir = \int I \cdot Sr \cdot d\lambda$$

$$\lambda b = \int Sb \cdot \lambda \cdot d\lambda, \quad \lambda r = \int Sr \cdot \lambda \cdot d\lambda$$

Sb; is the spectral sensitivity of a light measuring circuit in the blue region;

Sr; is the spectral sensitivity of a light measuring circuit in the red region.

Likewise, the following Mg is given even in the light-ray intensity Ir of the red region in the light source and the light-ray intensity Ig of the green region. This Mg is called a G-R ratio.

$$Mg = \frac{10^6}{Tg} = \frac{1}{K_{2g}} \cdot \left( \ln \frac{Ig}{Ir} - Kg \right) \quad (1\text{-}2)$$

$$M_{1g} = 5 \cdot \ln(\lambda r/\lambda g), \quad K_{2g} = (1/\lambda r - 1/\lambda g) \cdot C$$

$$Ig = \int I \cdot Sg \cdot d\lambda, \quad \lambda g = \int \lambda \cdot Sg \cdot d\lambda$$

Sg; is the spectral sensitivity of a light measuring circuit of green region.

In the case of correction by the combination of the LB filter and the CC filter, $$Mb - Mf = LB(Mrd) \quad (2)$$

$$Mg - (Mb - Mf) - Mf = Mg - Mb = CC(Mrd) \quad (3)$$

is given according to the value Mf corresponding to the color temperature of the film of various types, the B-R ratio, Mb, and the G-R ratio, Mg, above-mentioned. Here, $$Mf = 10^6/Tf$$

is given wherein Tf the is color temperature of the film used.

The LB, which is called the light balancing factor, shows the difference between the B-R ratio conformed to the film used and the B-R ratio of the measured illuminating light source. Also, the above-described CC is called color compensating factor, who shows the difference between the G-R ratio conformed to the film used and the G-R ratio through the correction of the corrected illuminating light source according to the LB factor. As described hereinabove, a person who performs the measurement can use the color filter such as an LB filter, and CC filter, conformed to the LB factor and the CC factor to perform a photographing operation of a color balance, which conforms to the film or image recording member used.

FIG. 1 is an analog circuit diagram of a photographic color meter showing a first embodiment of the present invention. A circuit (1) is composed of a filter (Fo) for allowing only the light ray of the blue region from among the incident light rays to pass therethrough, a light receiving element (PDo), a diode (Do) for logarithmic compression and an operation amplifier (OAo). The circuit (1) comprises a light measuring circuit for the blue region, which output a voltage (vb), wherein the intensity of the incident light of the blue region from among the incident light rays has been logarithmically compressed. A circuit (2) is composed of a filter (F2) for allowing only a light ray of the red region to pass therethrough, a light receiving element (PD2), an operation amplifier (OA2) and a diode (D2) for logarithmic compression. The circuit comprises a light measuring circuit for the red region, which outputs a voltage (Vr), wherein the intensity of the incident light of the red region from among the incident light rays has been logarithmically compressed. A circuit (3) is composed of a filter (F4) for allowing only a light ray of the green region to pass therethrough a light receiving element (PD4), a diode (D4) for logarithm compression, and an operation amplifier (OA4). The circuit (3) comprises a light measuring circuit for the green region, which output a voltage (Vg), wherein the intensity of the incident light of the green region from among the incident light rays has been logarithmically compressed.

Reference character (Eo) is a constant-voltage source which outputs a voltage ($V_{1b}$) corresponding to ($K_{1b}$) in the equation (1-1). Reference character (E2) is a constant-voltage source, which outputs a voltage ($V_{1g}$) corresponding to the $K_{1g}$ of an equation (1-2). A circuit (40), which is composed of resistors (Ro) through (R10) and an operation amplifier (OA6), comprises a subtracting circuit, wherein the resistors (Ro), (R2), (R4) are equal in resistance value, and the resistors (R6), (R8), (R10) are equal in resistance value. A circuit (42) composed of resistors (R12) through (R22) and an operation amplifier (OA8) is a subtracting circuit, wherein the resistors (R12), (R14) and (R16) are equal in resistance value and the resistors (R18), (R20) and (R22) are equal in resistance value. A circuit (50), which is composed of resistors (R24), (R26) and an operation amplifier (OA10), comprises an inversion amplifying circuit, wherein the ratio R26/R24 of the resistors (R24), (R26) corresponds to the $1/|K_{2b}|$ of the equation (1-1). A circuit (52), which is composed of resistors (R28) and (R30) and an operation amplifier (OA12), comprises an inversion amplifying circuit, wherein the ratio R30/R28 of the resistors (28), (30) corresponds to the $1/|K_{2g}|$ of the equation (1-2). ($K_{2b}$, $K_{2g} < 0$)

A circuit (60), which is composed of operation amplifiers (OA14), (OA16), transistors (BTo), (BT2), (BT4), a resistor (R32), a constant-voltage source (E4), and a diode (D6), comprises an inverse-number operation circuit for calculating the operation of $$Tb(\text{Kelvin}) = 10^6/Mb \qquad (5)$$

A circuit (62), which is composed of operation amplifiers (OA18), (OA20), transistors (BT10), (BT12), (BT14), a resistor (R34), a constant-voltage source (E6) and a diode (D8), comprises an inverse-number operation circuit for calculating the operation of $$Tg(\text{Kelvin}) = 10^6/Mg \qquad (6)$$

A circuit, which is composed of a constant-voltage source (E8), an operation amplifier (OA22), transistors (BT6), (BT8) and a light-emitting diode (LDo), comprises a warning circuit for indicating that the photographic color temperature Tb based on the output of the light measuring circuit (1) and (2) cannot be determined.

A circuit, which is composed of a constant-voltage (E10), an operation amplifier (OA24), transistors (BT16), (BT18) and a light-emitting diode (LD2), comprises a warning circuit indicating that the photographic color temperature Tg based on the output of the light measuring circuits (2) and (3) cannot be determined.

A variable-voltage source (E12) outputs a voltage (VMf) corresponding to the Mf (Mrd) of the equation (4), which corresponds to the color temperature of a manually determined film. A circuit (7), which is composed of resistors (R36) through (R42) and an operation amplifier (OA26), comprises a subtracting circuit for calculating the LB factor. Resistors (R36), (R38) are equal in resistance value and resistors (R40), (R42) are equal in resistance value. A circuit (8), which is composed of resistors (R44) through (R50) and an operation amplifier (OA28), comprises a subtracting circuit for calculating the CC factor. Resistors (R44), (R46) are equal in resistance value, and resistors (R48), (R50) are equal in resistance value.

Reference character (Mo) is a meter for displaying the Tb (Kelvin) shown in the equation (5). Reference character (M2) is a meter for displaying the Tg (Kelvin) shown in the equation (6). Reference character (M4) is a meter for displaying the LB factor shown in the equation (2). Reference character (M6) is a meter for displaying the CC factor shown in the equation (3).

The operation of the circuit of FIG. 1 will be described hereinafter. Assume that the intensity of each of the light rays which become incident to light receiving elements (PDo), (PD2) and (PD4) is Ib, Ir or Ig, and the voltage Vb, Vr, Vg corresponding to $\ln Ib$, $\ln Ir$ and $\ln Ig$ are outputted from the light measuring circuits (1), (2), (3). The outputs of the light measuring circuit (1), (2) and the voltage $V_{1b}$ corresponding to the $K_{1b}$ from the constant-voltage source (Eo) are inputted to the subtracting circuit (40). The voltage (V6) of $$Vb - Vr - V_{1b} = V6$$

is outputted from the subtracting circuit (40). The voltage (V6) corresponds to $$[\ln(Ib/Ir) - K_{1b}].$$

On the other hand, the output of the light measuring circuit (2), (3) and the voltage $V_{1g}$ corresponding to the $K_{1g}$ from the constant-voltage source (E2) are inputted to the subtracting circuit (42). The voltage (V8) of $$[Vg - Vr - V_{1g} = V8].$$

is outputted from the subtracting circuit (40). The voltage (V8) corresponds to $$[\ln(Ig/Ir) - K_{1g}].$$

The output voltage (V6) from the subtracting circuit (40) is inputted to the inversion amplifying circuit (50). The output voltage Vmb of the inversion amplifying circuit (50) is given as follows.

$$Vmb = -R24/R26 \cdot V6$$

$$= -R24/R28 \cdot (Vb - Vr - V_{1b})$$

As $$R24/R26 = 1/|K_{2b}| (K_{2b} < 0)$$

is established, Mmb corresponds to the following Mb.

$$Mb = 1/K_{2b} \cdot \{\ln(Ib/Ir) - K_{1b}\} \qquad (1\text{-}1)$$

On the other hand, the output voltage V8 from the subtracting circuit (42) is inputted to the inversion amplifying circuit (52). The output voltage Vmg of the inversion amplifying circuit (52) is given as follows.

$$Vmg = -R30/R28 \cdot V8$$

$$= -R30/R28 \cdot (V8 - Vr - V_{1g})$$

As $$R30/R28 = 1/|K_{2g}| (K_{2g} < 0)$$

is established, Vmg corresponds to the following Mg.

$$Mg = 1/K_{2g} \cdot \{\ln(Ig/Ir) - K_{1g}\} \qquad (1\text{-}2)$$

The output Vmb of the inversion amplifying circuit (50) is inputted to the inverse-number operation circuit (60). In the inverse-number operation circuit (60), a voltage-current converting circuit, which is composed of the operation amplifier (OA14), the transistor (BTo) and the resistor (B32), converts the input voltage Vmb into the current Imb proportional to the input voltage. The current Imb becomes the collector current of the transistor (BT2) for the current mirror use and is inputted to the logarithmic compression circuit composed of the diode (D6), the constant-voltage source (E4) and the operation amplifier (OA16). Accordingly, assume that the output voltage of the constant-voltage source (E4) is V2, and the output V4 of the operation amplifier (OA16) is given as follows.

$$V4 = V2 - \beta 1 \cdot \ln Imb$$

-continued $$= V2 - \beta 2 \cdot \ln Vmb$$

wherein $\beta 1$ and $\beta 2$ are constants. The output V4 of the operation amplifier (OA16) is logarithmically expanded into current by the transistor (BT4). Assume that the collector current of the transistor (BT4) is Itb, and $$Itb = \beta 3 \cdot \exp(V4)$$
$$= \beta 3 \cdot \exp\{V2 - \beta 2 \cdot \ln Vmb\}$$
$$= \beta 4 \cdot \exp(V2)/Vmb$$

wherein $\beta 3$ and $\beta 4$ are constants, are given. Through the proper selection of the output voltage V2 of the constant-voltage source (E4) the Itb becomes a value corresponding to $$Tb = 10^6/Mb \tag{5}$$

to give the photographic color temperature determined by the B-R ratio. The photographic color temperature Tbk (Kelvin) is displayed by the meter (Mo). The collector current Itg of the transistor (BT14) becomes $$Itg = \beta 4 \exp(V10)/Vmg$$

according to the input Vmg and the output (V10) of the constant-voltage source (E6) from an inverse-number operation circuit (62), which is the same in construction as the inverse-number operation circuit (60). The current value of the transistor collector (BT14) becomes a value corresponding to $$Tg = 10^6/Mg \tag{6}$$

The photographic color temperature Tgk (Kelvin) determined by the G-R ratio is given from the inverse-number operation circuit (62), and is displayed by the meter (M2).

When the output Vmb of the inversion amplifying circuit (50) is larger than the output voltage (V14) of the constant-voltage source (E8), the output of the operation amplifier (OA22) becomes "high" to render the transistor (BT5) nonconductive and, then, the inverse-number operation circuit (60) and the meter (Mo) becomes inoperative. At this time, transistor (BT8) becomes conductive to light the light-emitting diode (LDo) to provide the warning. The reason why the warning is given is that if the photographic color temperature obtained from the measured B-R ratio becomes 0 K or lower it renders the definition impossible to be made as the color temperature. Similarly, if the photographic color temperature given from the measured G-R ratio becomes 0 K or lower by the constant-voltage source (E10), the operation amplifier (OA24), the transistor (BT16), (BT18) and the light-emitting diode (LD2), thereby render the inverse-number operation circuit (62) and the meter (M2) inoperative to cause the light-emitting diode (LD2) to give a warning.

The subtracting circuit (7) inputs the output voltage Vmf from the constant-voltage source (E12) and the output Vmb of the inversion amplifier (50) to output the voltage of $$VLB = Vmb - Vmf$$

The Vmf corresponds to the MfMrd (Mrd) corresponding to the color temperature of a film shown in the equation (4), the Vmb corresponds to the MbMrd (Mrd), and the VLB corresponds to the LB factor shown in the equation (2) and is displayed by the meter (M4).

The Vmb, and the Vmg from the inversion amplifying circuit (52) are inputted to the subtracting circuit (8) and the voltage of $$Vcc = Vmb - Vmg$$

is outputted from the subtracting circuit (8). As the Vmg corresponds to the CC factor shown in the equation (3), the voltage Vcc being displayed by the meter (M6).

In this embodiment, a circuit is provided to give a warning when the outputs Vmg, Vmg of the inversion amplifiers (50), (52) have become V14, V16 or more, respectively. In addition, a circuit may be added to give a warning likewise even when a light source wherein the photographic color temperature becomes infinite has been measured. The warning is given when the outputs of the inversion amplifiers (50), (52) have become a given value or lower. The warning circuit is required to be the same in construction as the warning circuit of FIG. 1.

Figure 2:
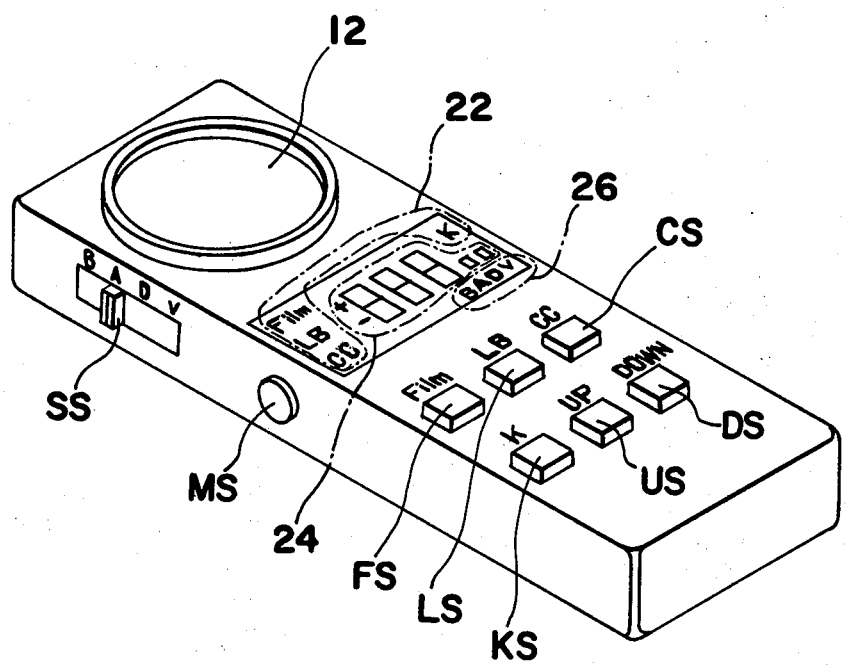
FIG. 2 is a perspective view of a photographic color meter to which the present invention has been applied.

FIG. 2 is an appearance view of a color meter to which the present invention has been applied. The construction and function of the color meter of FIG. 2 will be described hereinafter.

Reference numeral (12) is a light receiving unit with three filters and light receiving elements disposed therein. Reference character (SS) is a slide switch for setting a film type. When the switch (SS) is placed in a position B, the B type (color temperature 3,200 K in a tungsten type) is set, while, when the switch (SS) is placed in a position A, the A type (color temperature 3,400 K in a tungsten type) is set. When the switch SS is placed in a position D, the D type (color temperature 5,500 K in a daylight type) is set. Also, when the switch SS is located in a position V, the color temperature of a film to be set becomes variable.

Reference character (FS) is a button to be depressed when the film type is required to be changed. When the button (FS) is depressed, the display unit (22) displays film and K, which show a film-set operation. Data corresponding to the position of the slide switch (SS) is read to display the color temperature on the display unit (24), and the display unit (26) displays a set film type B, A, D or V, which stands for variable. Also, when the film type is variable, depression of UP button (US) or a DOWN button (DS) simultaneously with the button (FS) and the color temperature of the film to be set at a given time period changes during the depression of the two buttons thereby to display the set value on the display unit (24). When the UP button (US) is in its depressed position the set color temperature increases. When the DOWN button (DS) is in its depressed position, the set color temperature decreases. Once the UP button or the DOWN button is released, the momentary color temperature display is fixed and the value of the display is stored as a color temperature set-value of the film. The color temperature to be set has a top limit and a bottom limit. When the value has reached the limit, the set value and the display value remain unchanged even if the buttons (US) and (DS) are, respectively, in depressed positions. Even if only the buttons (US) and (DS) have been depressed, the set value and the display value remain unchanged.

Reference character (LS) is a button, which is depressed when the LB factor is required to be given. When the button (LS) is depressed, "LB" of the display unit (22) is displayed. And when a measured value is maintained, the value of the LB factor is displayed by the display unit (24). Also, when the measured value is not maintained, nothing is displayed on the display unit (24). When a measuring button (MS) is depressed to read the measured value, the LB factor according to the value is displayed on the display unit (24). Reference character (CS) is a button, which is depressed when the CC factor is required to be given. When the button (CS) is depressed, "CC" is displayed on the display unit (22). When the measured value is read in as in the (LS) button, the CC factor is displayed on the display unit (24). When the measured value is not maintained, nothing is displayed on the display unit (24) before the measuring button (MS) is depressed and the measured value is read in. Reference character (KS) is a button, which is depressed when the photographic color temperature determined from the B-R ratio is required to be given. When the button (KS) is depressed, K is displayed on the display unit (22). When the measured value is maintained as in the (LS) and (CS), the photographic color temperature is displayed on the display unit (24). When the measured value is not maintained, nothing is displayed on the display unit. A film type, which is kept set if any button is depressed, is displayed on the display unit (26).

When the measuring button (MS) is depressed, the measuring operation is performed except in a film type setting mode. While the button (MS) is depressed, the measuring operation is repeated to display the LB factor, the CC factor or the photographic color temperature parameter according to the new measured value. When the (FS) button is depressed and the mode for setting the film type is provided, no measuring operation is performed even if the measurement button (MS) is depressed. Also, when the light source brightness to be measured becomes a given value or lower, the calculated data is not reliable, so that the display unit (24) flashes and displays the calculated data. When the calculated data has reached a top limit or bottom limit in the case of the photographic color temperature, the display unit (24) flashes and displays the top limit value or the bottom limit value. Also, when the button actions are performed, the entire display performs the same displaying operation for a given time period (when the flashing operation is performed, the flashing operation continues) and stops the displaying operation after a given time period.

Figure 3:
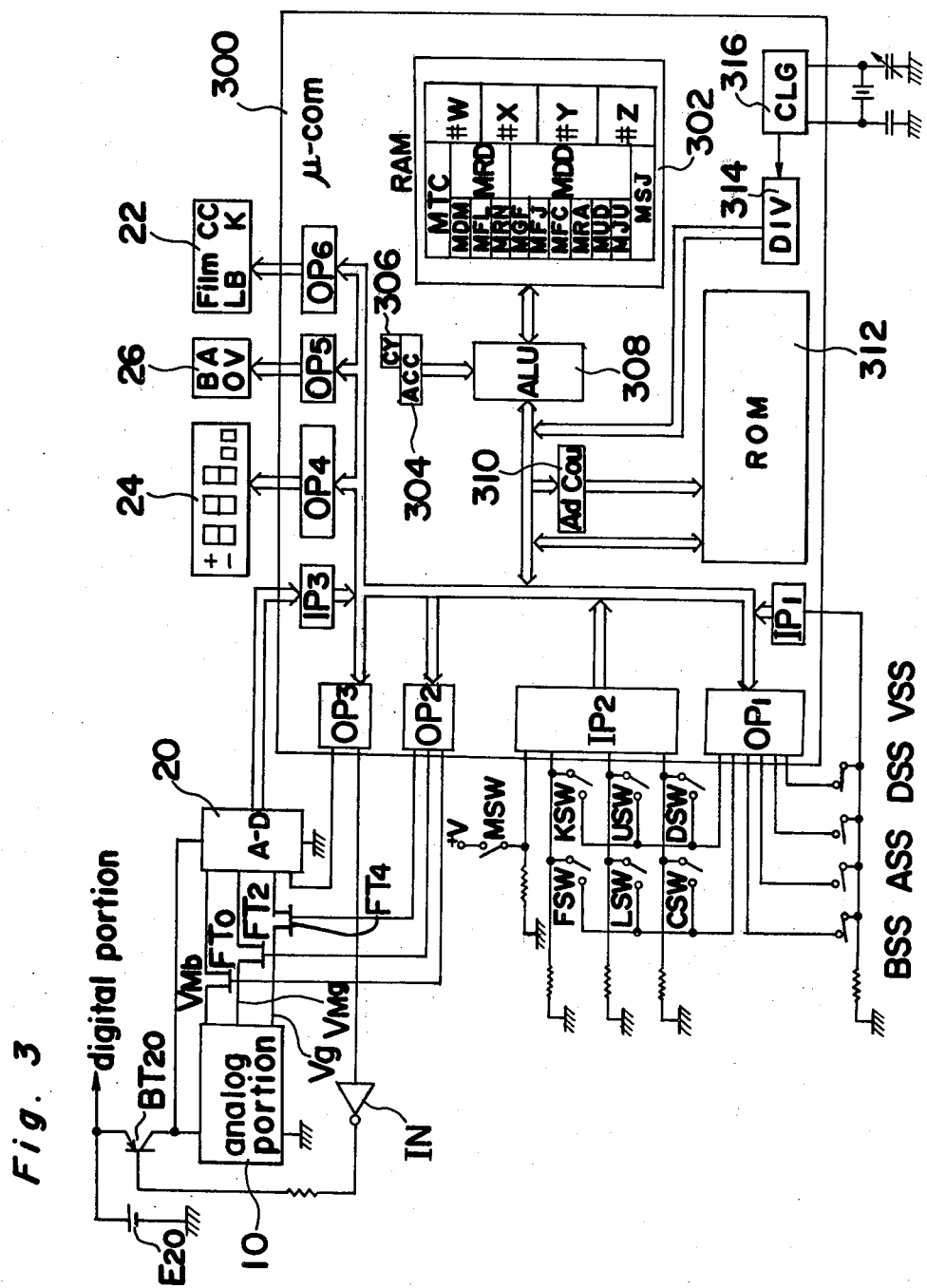
FIG. 3 is an electronic circuit diagram to be employed in a photographic meter according to a second embodiment of the present invention.

The circuit construction accommodated in the color meter of FIG. 3 will be described hereinafter. Reference number (300) is one chip of a micro-computer, what is called as a μ-com, wherein the circuit is composed of, for example, C-MOSFET of which the consumption power is less. Power to the circuit (300) is normally fed from a power supply cell (E20). Within the μ-com (300), there are provided RAM (302), accumulator (ACC) (304), carry flag (CY) (306), logical operation circuit (ALU) (308), address counter (Ad. Cou.) (310), ROM (312), frequency divider (DIV) (314), clock generator (316), input ports (IP1) through (IP3), and output ports (OP1) through (OP6). In addition, there are various circuit blocks, which will be omitted in description, since the circuit blocks have no direct relation to the present invention.

Within the RAM (302), there are registers with various labels thereon and the functions of these registers will be described hereinafter. Reference character MTC is a register, which counts the time required from the button-action completion of the display off. Reference character MRD is a register, which sets the color temperature parameter data of a set film type, for instance, in this embodiment, MF-$10^6$/TfMrd is set. Fixed data at a type B is shown by K4, a fixed data at a type A is shown by K5, and a fixed data at a type D is shown by K6. In the MDD, a displaying data is set on the display unit (24), and the data for blank display (no display) is shown by K3. Also, the data corresponding to the top limit from the display limit values of the color temperature is shown by K1 and the data corresponding to the bottom limit is shown by K2. Reference character MDM is a register, which sets the discrimination result of the operation mode. Within the register MDM, 8 is set in a film type setting mode, 4 is set in a LB factor calculation mode, 2 is set in a CC factor calculation mode, and 1 is set in a color temperature calculation mode. Reference character MFL is a register wherein 1 is provided when all the measured data are read in and 0 is provided when all the measured data are not read in. Reference character MRN is a register, wherein a signal is inputted for switching to input one of the outputs (Vmb, Vmg and Vg) from an analog circuit (10) into an A-D converting circuit (20), and the Vmb is inputted at 4, the Vmg is inputted at 2, and the Vg is inputted at 1. Reference character MGF is a register, wherein 1 is provided when the measuring operation is performed through depression of the measuring button (MS) and 0 is provided when the measuring operation is not performed. Reference character MFJ is a register, wherein 1 is provided in a case where the display is required to flash to give a warning when the level of the Vg is a given value or less (when incident light quantity is less) and 0 is provided in a case where the warning is not required. Reference character MFC is a register, wherein 1 exists when the blank display is required to be performed in the flashing display and 0 exists when the data display is required to be performed. Reference character MRA is a register, wherein the data α from an input port (IP1) is read in such a manner that 8 is provided when the set film type is B, 4 when it is A, 2 when it is D and 1 when it is variable. Reference character MUD is a register, where 2 is provided when the down button (DS) is in its depressed position, 1 is provided when the up button (US) is in its depressed position and 0 is provided when both buttons are not in the depressed position. Reference character MJU is a register, wherein 1 is provided when the calculated color temperature has exceeded a limit and 0 is provided when it has not exceeded the limit. Reference character MSJ is a register, wherein the data, by the button action, from an input port (IP2) is read in. Reference character #W is a register, wherein the A-D converting data from an input port (IP3) is read in. Reference character #X is a register, wherein the data of the register #W is a data corresponding to Mb, the data is set. Reference character #Y is a register, wherein when the data of the register #W is data corresponding to Mg, the data is set. Reference character #Z is a register, wherein when the data of the register #W is data corresponding to Vg, the data is set.

Strobe signals are normally outputted from the output ports OP1 to scan switches (FS), (LS), (CS), (KS), (US), (DS), (BSS), (ASS), (DSS) and (VSS). In addition, the 1 chip μ-com executes the instruction from a specified address (0 address) of the ROM (312) when the input of a switch has been provided at an inoperative condition (the condition of CEND) or a one-second-lapsed signal from the frequency divider (314) has been provided.

A transistor (BT20) is a transistor, which controls the feeding to the analog circuit (10) and the A-D converter (20) by a signal, through an inverter (IN), from the μ-com (300). Reference numeral (10) is an analog circuit composed of the light-measuring circuit (1), (2), (3), the constant-voltage sources (Eo), (E2), the subtracting circuits (40), (42) and the inversion amplifiers (50), (52). The Vmb, Vmg from the inversion amplifiers (50), (52) and the Vg from the light measuring circuit (3) are outputted from the analog circuit (10). Reference characters FET (FTo), (FT2) and (FT3) are analog switches. The data within the MRN register is outputted from the output port (OP3) of the μ-com (300). When 4 has been outputted from the μ-com 1300, the FET (FTo) becomes conductive to input the Vmb to the A-D converter (20). When 2 has been outputted, the FET (FT2) becomes conductive to input the Vmg. Also, when 1 has been outputted, the FET (FT4) becomes conductive to input the Vg. The Vg is used to determine whether the incident light is a given value or more. Reference numeral (20) is an A-D converter, which is actuated by a signal from the output port (OP3) of the μ-com (300). The A-D conversion results are read into the μ-com (300) from the input port (IP3). Reference numeral (22) corresponds to the display unit (22) of FIG. 2, reference numeral (24) corresponds to the display unit (24) of FIG. 2, and reference numeral (26) corresponds to the display unit (26) of FIG. 2, the display units being composed of, for example, liquid crystal.

Reference numeral (MSW) is a switch, which is closed when the light measuring button (MS) of FIG. 2 has been depressed. Reference character (FSW) is a switch, which is closed when the film type setting button (FS) of FIG. 2 has been depressed. Reference character (LSW) is a switch, which is closed when the LB calculating button (LS) of FIG. 2 has been depressed. Reference character (CSW) is a switch, which is closed when the CC calculating button (CS) of FIG. 2 has been depressed. Reference character (KSW) is a switch, which is closed when the button for the calculating color temperature (KS) of FIG. 2 has been depressed. Reference character (USW) is a switch to be closed through the depression of the button (US), which is depressed to increase the set color temperature of a film of FIG. 2. Reference character (DSW) is a switch to be closed through the depression of the button (DS), which is depressed to decrease the set color temperature of a film of FIG. 2. Reference character (BSS) is a switch, which is closed when the slide switch (SS) of FIG. 2 is located in a position B. Reference character (ASS) is a switch, which is closed when the slide switch (SS) of FIG. 2 is located in a position A. Reference character (DSS) is a switch which is closed when the slide switch (SS) of FIG. 2 is located in a position D. Reference character (VSS) is a switch, which is closed when the slide switch (SS) of FIG. 2 is located in a position of V.

Figures 1, 4:
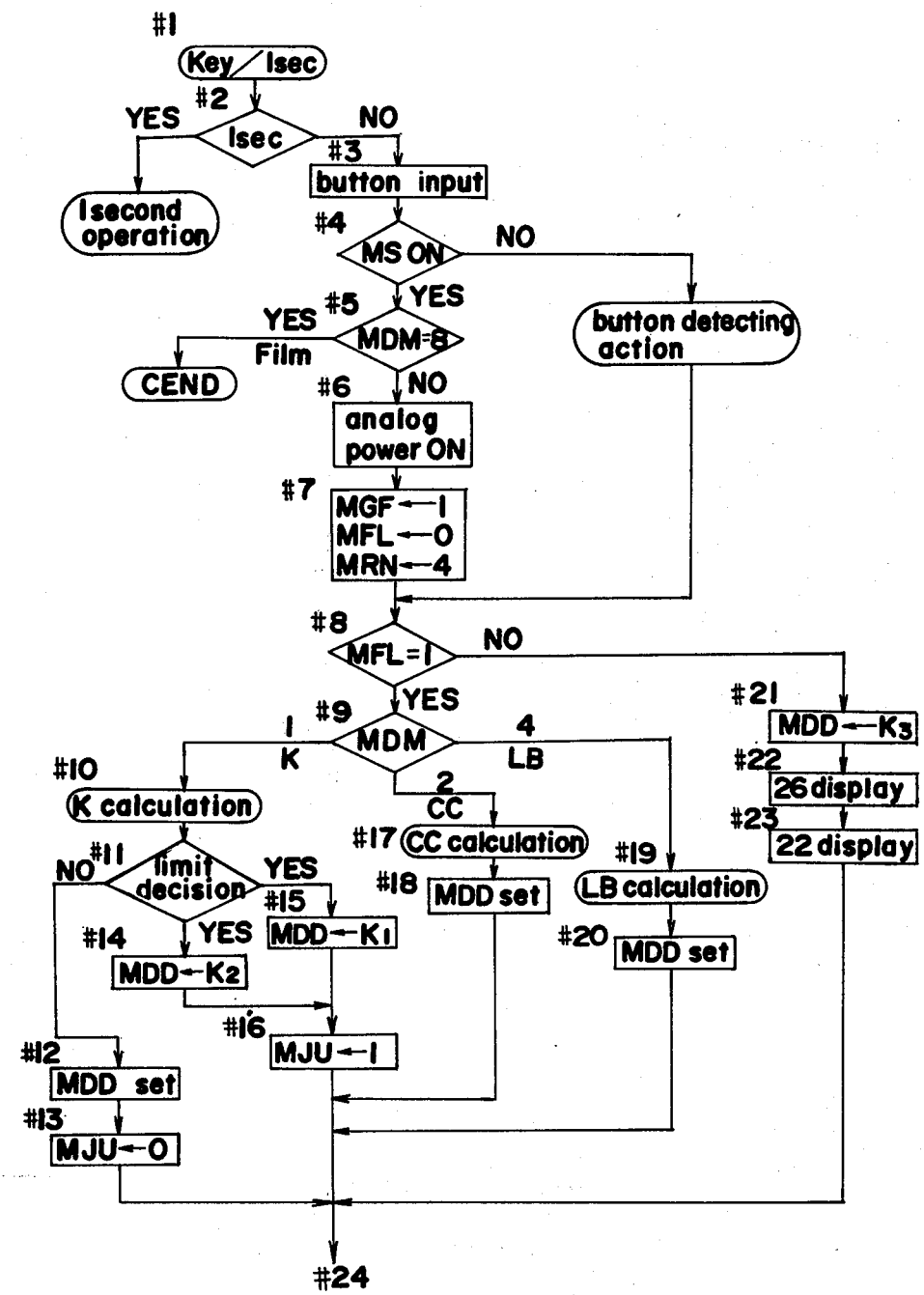
Figures 2, 4:
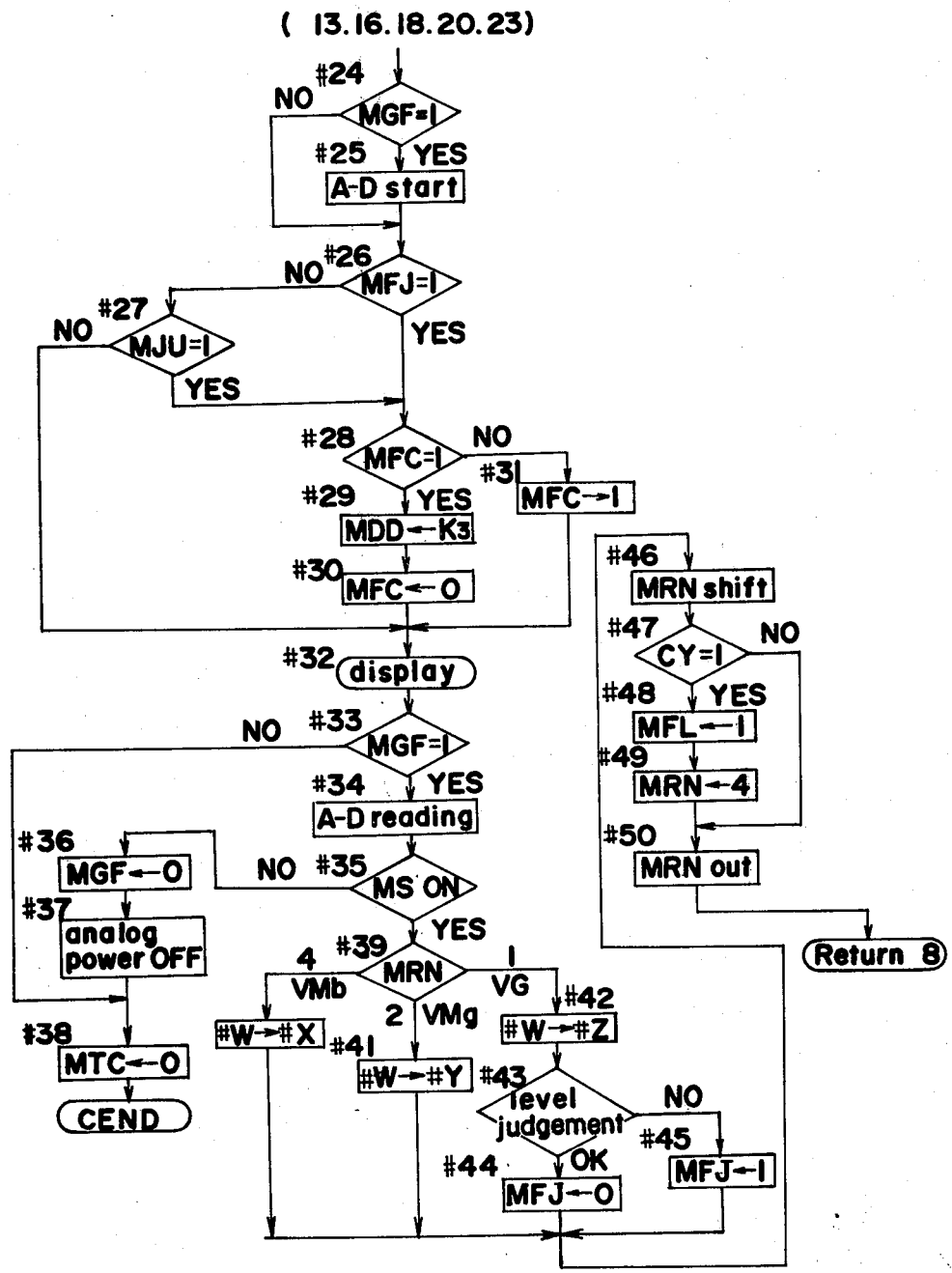
Figures 3, 4:
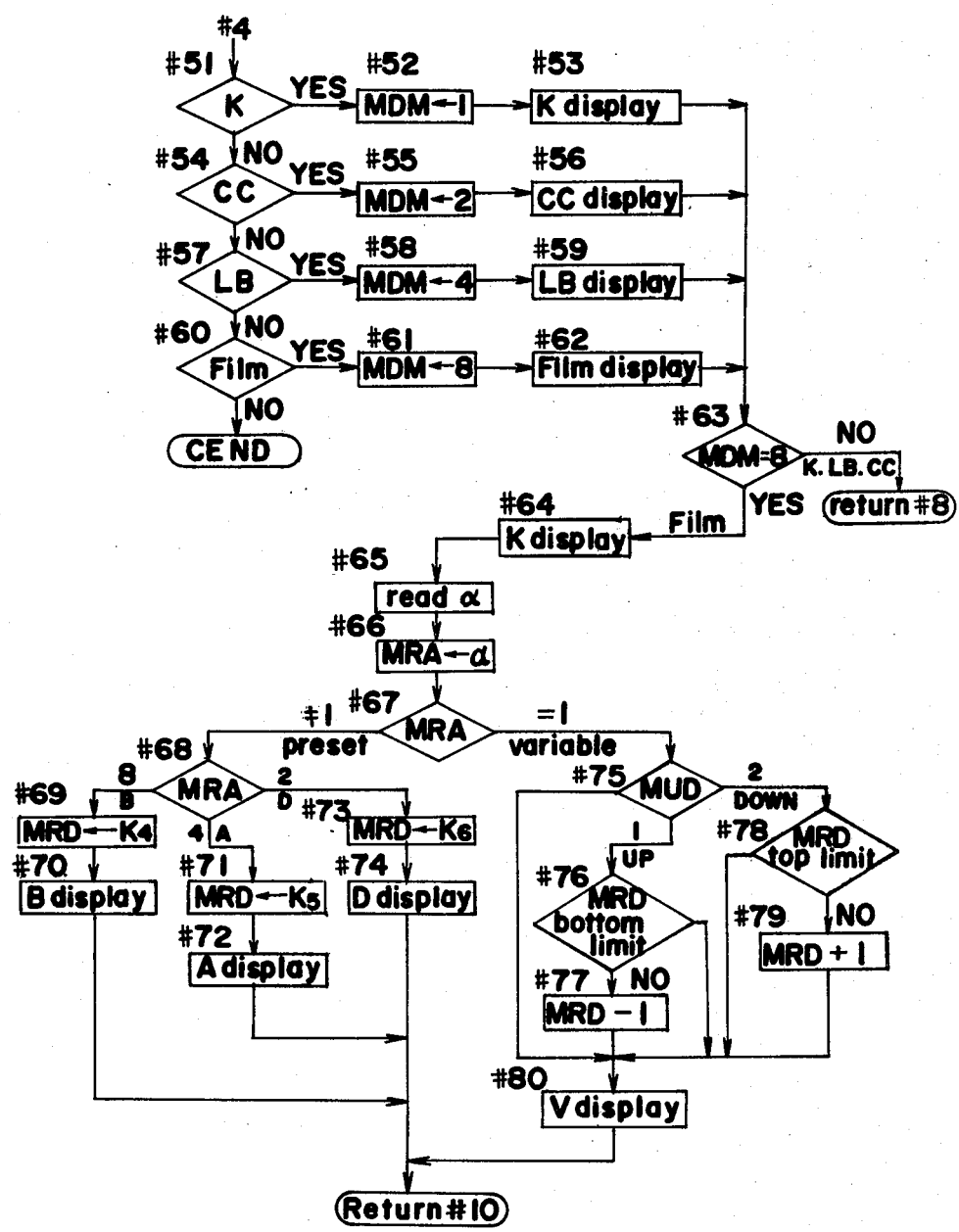
Figure 4:
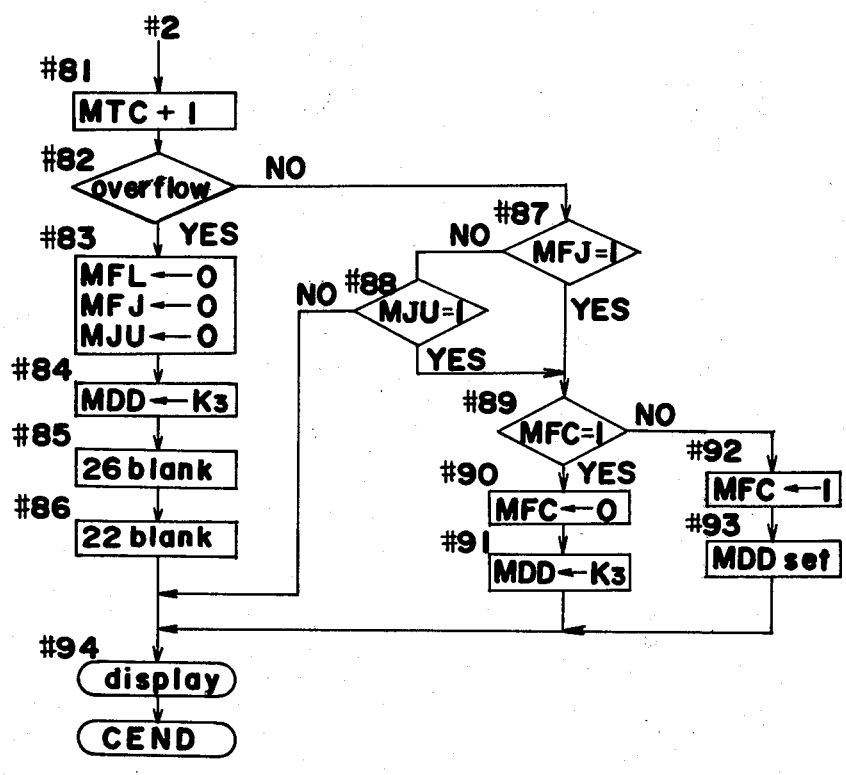

The operation of the μ-com (300) shown in FIG. 3 will be described hereinafter with reference to the flow charts of FIG. 4-1 through FIG. 4-4. FIG. 4-1 and FIG. 4-2 mainly show the flow charts of the measurement, calculation and display operations with respect to the μ-com (300), FIG. 4-3 mainly shows the flow chart of the button detecting and the data setting operation, and FIG. 4-4 shows the flow chart of the display operation in a case where the button operation is not performed.

When the input from the button or one-second signal from the frequency divider (314) has been provided, the μ-com (300) starts its operation from the instruction within the specific address of the ROM (312). At a step #2, the decision is performed as to whether the operation is started by the one-second signal or by the signal from the button. In the case of the one-second signal, the step moves to a step #81 of FIG. 4-4. When it is not the one-second signal, the data from the input port (IP2) is read into the register MSJ inside the RAM (302) to detect which button is depressed at a step #3. Then, at a step #4, a detection is performed as to whether or not the switch (MSW) is closed according to the contents of the register MSJ wherein the button signal within the RAM (302) has been read in. When the button is not in its depressed position, the step moves to the step #51 of FIG. 4-3, while, when the button is in its depressed position, the step moves to a step #5. At the step #5, detection is made as to the contents of the register MDM. When MDM=8 that is, the film type setting mode, the CEND is provided to stop the operation. Namely, in the film type setting mode, the measuring operation is not performed.

Once detection is made that the mode is not in the film type setting mode at step #5, a signal "high" is inputted to the inverter (IN) from the output port (OP3) at the step #6 to render the transistor (BT20) conductive thereby to start the feeding operation to the analog circuit (10) and the A-D converter (20). And 1 is set in the register MGF to indicate that the measuring operation is performed at a step #7 to put the register MFL into O, in which register 1 is provided when three measured values have been read in, since the measured value are not read in. Also, 4 is set, in the register MRN for specifying the data to be read in, to specify the data Mb to be read-in at first. At a step #8, decision is made as to whether the register MFL is 1 or 0. When the three measured data have not been read in yet through closure of the measuring switch (MS), the step moves to the step #21, since the register MFL is 0. A blank displaying data K3 is set in the register MDD to decide the registers MRA, MDM so that the set film type is displayed on the display unit (26) and the set calculation mode is displayed on the display unit (22) and the step moves to a step #24.

When the three measured data are arranged, at a step #8, with the measuring switch (MS) being closed, or when the measured data are arranged after the button deciding action to be later described according to FIG. 4-3, the step moves to a step #9 to decide the contents of the register MDM to decide the calculation mode. When the register MDM is 1, the step moves to a mode (a step #10) wherein the photographic color temperature determined by the B-R ratio Mb is calculated, thereby to perform the operation of $$Tb = 10^6/Mb \quad (5)$$

Then, at a step #11, a decision is made as to whether or not the calculated data exceeds a display limit value.

When the calculated data does not exceed it, the displaying data corresponding to the calculated data is set in the register MDD. And O is set in the register MJU so that the flash display is not performed and the step moves to a step #24. When it has been decided that the calculated data exceeds the display limit at the step #11, a top limit data K1 or a bottom limit K2 is set in the register MDD at the step #14 or the step #15 to set 1 in the register MJU so that the flash display may be performed thereby to move to the step #24.

When the content of the register MDM is 2 at the step #9, the CC calculation is performed. The operation of $$CC = MG - Mb \qquad (3)$$

is performed at the step #17 to set the displaying data in the register MDD thereby to move to the step #24.

When the content of the register MDM is 4 at the step #9, the mode is a LB calculation mode. At the step #19, the operation of $$Lb - Mb - Mf \qquad (2)$$

is performed to set the displaying data in the register MDD thereby to move to the step #24.

At the step #24, the register MGF is decided to judge whether or not the light is being measured. When the light is not being measured, the step goes to the step #26, while, when the light is being measured, an A-D conversion starting signal is outputted, at the step #25, from the output port (OP3). Time required from the step #6 to the step #25 is longer than the time required for the analog circuit (10) to be stabilized.

At the step #26, decision is made as to whether or not the register MFJ is 1 when the output level of the light measuring circuit is located at a given value or less at the steps #42 through #45 to be described later. When the MFJ is not 1, decision is made as to whether or not the register MJU is 1. When the register MJU is not 1, the step goes to the step #32 to perform the displaying operation according to the data of the MDD. When the register MFJ or MJU is 1, decision is made as to whether or not the register MFC is 1 at the step #28. Also, when the register MFC is 1, the blank displaying data K3 is set in the register MDD to render the MFC zero. At the step #32, the blank is displayed on the display unit (24). Also, when the register MFC is not 1 at the step #28, 1 is set in the MFC, at the step #32, to display the contents of the register MDD on the display unit (24). Namely, when MFJ and MJU are 1, the operations of the steps #26 through #36 display the calculated data and the blank alternately on the display unit (24) every time the step is past, whereby the flashing display is performed.

At the step #33, decision is made as to whether or not the measuring operation is being performed again. When the measuring operation is not being performed, i.e., when the operation has been performed through depression of a button except for the measuring button, the register MTC for timer, which causes the displaying operation to be continued for a given time period, is reset at the step #38 to stop the operation.

When it is decided that the measuring operation is being performed at the step #33, the A-D converted data is read into the register #W from the input port (IP3) to decide whether or not the measuring switch (MSW) is closed or not. When the measuring switch (MSW) is not closed, the step goes to the step #36 to render the register MGF zero. The feeding transistor (BT20) to the analog circuit is turned off thereby to move to the step #38. Once it is decided that the measuring switch (MSW) is closed at the step #35, the step #35 goes to the step #39 to decide the contents of the register MRN. When the content of the register MRN is 4, the input voltage to the A-D transducer (20) is Vmb to set the data, read into the register #W, in the register #X. When the MRN is 2, the A-D converted data which corresponds to the Mg is set in the #Y register. Also, when the MRN is 1, the A-D converted data which corresponds to the output Vg of the light measuring circuit (3) of FIG. 1 is set in the #Z register to decide whether or not the data is at a given value or less. When the incident light quantity is at a given level or less, the calculated data is not reliable and this is performed to warn against it. When the incident light quantity is at a given value or less, 1 is set in the register MFJ while, when it is at a given value or more, O is set. The MFJ is used to decide as to whether or not the display is made to be flashed at the step #26 and at the step #87 to be described later. The time required from the step #25 to the step #34 is longer than the time required for the A-D conversion.

At the step #46, the bit of 1 in the register MRN is shifted by one bit onto the lower unit side. Namely, 4 is put to 2 and 2 is put to 1, and when it is 1, 1 is provided in the carry (306). At the step #47, decision is made as to whether or not the 1 is in the carry (306), and when 1 is not in the carry, the step goes to the step #50 to output the content of the MRN to the output port (OP2) thereby to return to the step #8. When 1 is provided in the carry (306) at the step #47, three data are adapted to be read in. Thus, 1 is set in the register MFL and 4 is set in the register MRN thereby to move to the step #50.

While the measuring button (MS) is in its depressed position, the three data are repeatedly read in in order through the action when the measuring button (MS) is depressed. The operation and display are performed, in accordance with the set calculation mode, on the base of these data. Once the measuring button (MS) is released, the action moves to the time counting operation for continuing the displaying operation.

Then, the operation in a case where the buttons except for the measuring button have been acted will be described hereinafter with reference to FIG. 4-3. The data read-in in the register MSJ at the step #3 are decided at the steps #51, #54, #57 and #60. In the K calculation, 1 is set in the register MDM to display the K on the display unit (22). In the CC calculation mode, 2 is set in the MDM to display the CC on the display unit (22). In the LB calculation mode, 4 is set in the MDM to display the LB. In the film type setting mode, 8 is set in the MDM to display the film thereby to move to the step #63.

At the step #63, the content of the register MDM is decided. When the MDM #8 is established, the mode is the calculation mode, and the step goes to the step #8. When the reading-in operation of the measured value has been completed, the operation and display are performed in accordance with the set calculation mode to stop the action thereby to move to the counting operation of a given time period. Also, when reading-in operation of the measured value has not been performed, the displaying operation is performed on the display unit (26) by the step #21 or lower to stop the operation.

When the MDM=8 is established at the step #63, the step moves to the step of the film type setting mode of the step #64 or lower. At the step #64, the data α corresponding to the condition of the switches (BSS), (ASS), (VSS) from the input port (IP1) is read in to set in the register MRA. Then, decision is made as to whether or not the content of the register MRA is 1. When the content is not 1, the step moves to the step #68, since the type of B, A or D is required to be set. When the content is 1, the step moves to the step #75, since the film setting color temperature is variable.

At the step #68, the content of the register MRA is decided. In the MRA=8, a data K4 (data of Mrd unit) corresponding to the film of the B type is set in the register MRD to display B on the display unit (26) thereby to move to the step #10. When the data K5 (Mrd) corresponding to the film of the A type is set in the register MRD, when MRA=4 is established at the step #68, to display A on the display unit (26), thereby to move to the step #10. When the MRA=2 is established at the step #68, a data K6 (Mrd) corresponding to the film of a D type is set in the MRD to display the D, thereby to move to the step #10.

When the set color temperature of the film is variable, the step moves from the step #67 to the step #75. At this time, in a case where the content of the register MUD is decided and the MUD=0 is established, both the UP button and the DOWN button are not in their depressed positions. Thus, the step moves to the step #80 to display the V on the display unit (26) thereby to move to the step #10. When the MUD=1 is established, the content of the MRD is compared with the value of the bottom limit. When the content of the MRD has reached to the bottom limit, the step goes to the Step #80. When the content has not reached to the bottom limit, 1 is subtracted from the content of the register MRD to move to the step #80. When the MUD=2 is established at the step #75, the content of the MRD is compared with the value of the top limit at the step #78. When the content thereof has reached to the top limit, the step moves to the step #80. When the content thereof has not reached to the top limit, 1 is added to the content of the MRD thereby to go to the step #80.

When the step returns to the step #10 from the step #70, #72, #74 or #80, the operation of $$Tf = 10^6 / Mf \qquad (4)$$

is calculated according to the MF set in the register MRD to perform the displaying operation thereby to stop the operation. In a case where the Film button (FSW) and the UP button (USW) or the DOWN button (DSW) are in depressed positions under the inoperative (CEND) condition, the operation is performed again to change the set value. Namely, while the button is in its depressed position, the set value is varied according to a given time period.

FIG. 4-4 is a flow chart, which is related to an operation of continuing the display for a given time period after the completion of the operation of the buttn action. When one-second signal is provided from the frequency divider (314) in the condition of the CEND, the μ-com (300) starts its operation thereby to move to the step #81, and 1 is added to the register MTC for timer use to decide whether or not the overflowing operation has been performed. When the overflowing operation has been performed, the blank displaying data K3 is set in the displaying data register MDD, with the register MFL showing the reading-in completion of the measured value being 0, and the registers MFJ, MJU showing the execution of the flash display being 0, to turn off the display units (22), (26) to output the data K3 of the MDD, so that the CEND condition is provided. Thereafter, no display is provided on the display unit unless the button action is operated.

When no overflow exists at the step #82, decision is made as to whether or not the flash display is performed at the steps #87 and #88. When no flash display is performed, the step goes to the step #94 to continue the display. When it has been decided that the flash display is performed at the steps #87, #88, decision is made as to whether or not 1 is provided in the register MFC at the step #89. When 1 is provided in the register, 0 is set in the MFC to set the blank display data in the MDD thereby to move to the step #94. When the MFC has 0, 1 is set in the MFC to set the displaying data in the MDD thereby to move to the step #94. Accordingly, after the operation related to the button action has been completed, the display is continued for a given time period, and when the flashing operation for warning is required, the flashing operation is performed at an one-second period.

In the above-described embodiment, the B-R ratio and the G-R ratio are given to perform the operation. According to the present invention, it is not an object to provide the B-R ratio and the G-R ratio as in the conventional color meter, but it is an object to provide the light balancing factor and the color compensating factor. Thus, it is not restricted to only the embodiment wherein the operation through the B-R ratio and the G-R ratio is performed. Namely, the light balancing factor is a value, which is determined when the light intensity of the blue region, the light intensity of the red region and the color temperature of the film are given. The color compensating factor is a value, which is determined when the respective light intensity of blue, green, red and the color temperature of the film are given. Thus, the value can be optional as the intermediate calculation process so that the B-R ratio and the G-R ratio are not necessarily given.

In the above description, it was a precondition to use the LB filter and the CC filter each having the following operation. Namely, the LB filter functions to compensate for the difference between the entire inclination of the characteristic curve of the color balance of a light source and that of the film. The CC filter functions to compensate for the local difference between the light source and film in the characteristic curve has been corrected. The color meter is used to select the respective proper correcting strength about each of the LB filter and the CC filter.

However, the color correction is not restricted to the combination between the LB filter and the CC filter as described hereinabove. In addition to the above method, there is a method comprising the steps of using a CC filter having the local correcting function in the green region to perform the correcting operation (in this case, the LB filter is not used) for the green region only and using a second CC filter having the local correcting function in the blue region to perform the correcting operation for the blue region only thereby to correct the difference between the characteristic curve of the color balance ranging from the red to the blue of the light source and that of the film.

In this case, the B-R ratio (Mb) and the G-R ratio (Mg) are used for representation, and CC1 and CC2 defined by $$Mg - Mf = CC1 \quad \text{(Mrd)}$$

$$Mb - Mf = CC2 \quad \text{(Mrd)}$$

respectively become indexes (they are both color compensating factors) for the local correction of the green region and for the local correction of the blue region. Accordingly, as in the above embodiment, the present invention may be constructed not only to display the combination of the light balancing factor (LB) with the color compensating factor (CC), but also to display the combination of the color compensating factor (CC1) and the color compensating factor (CC2). This can be realized through the light modification of the above embodiment. As apparent from the definition of the CC1 and CC2, the color compensating factor (CC1) is a value, which is determined when the respective light intensity of the green and blue regions and the color temperature of the film are given. On the other hand, the color compensating factor (CC2) is a value, which can be determined when the respective light intensity of the blue and red regions and the color temperature of the film are given. Thus, the B-R ratio (Mb) and the G-R ratio (Mg) are not required to be given as in the above embodiment, and the intermediate calculation process is optional.

As described hereinabove, the present invention proposes, as a novel color meter, an appliance, which can directly display the light balancing factor or the color compensating factor with respect to the conventional color meter, which is known as the appliance which measures and displays the B-R ratio and the G-R ratio. According to the present invention, the determination of the color correcting filter can be made more quickly and easily than before, thus resulting in greater convenience for the photographing operation.

Although the present invention has been described and illustrated in detail, it is to be clearly understood that the same is applied by way of illustration and example only and is not to be taken by way of limitation, the spirit and scope of the present invention being limited only by the terms of the appended claims.

What is claimed is:

1. A color meter for use with a color image recording apparatus comprising a first light measuring circuit for outputting a signal corresponding to the intensity of the incident light of a red region from among the incident light rays, a second light measuring circuit for outputting a signal corresponding to the intensity of the incident light of a green region, a third light measuring circuit for outputting a signal corresponding to the intensity of the incident light of a blue region, a setting apparatus for outputting a signal corresponding to a color temperature parameter of an image capturing member to be used, a processing circuit which can produce a light balancing factor and/or a color compensation factor in response to a necessary signal from the signals from said first, second and third light measuring circuit and the signal from said setting apparatus, and a display apparatus which can display the light balancing factor and/or the color compensating factor according to the signal of the processing circuit.

2. A color meter described in accordance with claim 1, wherein said processing circuit comprises a first operation circuit for calculating a signal corresponding to a blue-red ratio according to a signal from said first light measuring circuit and a signal from said third light measuring circuit and a second operation circuit for calculating a signal corresponding to the light balancing factor in response to a signal from said setting apparatus and a signal corresponding to said blue-red ratio.

3. A color meter described in accordance with claim 1, wherein said processing circuit comprises a first operation circuit for producing a signal corresponding to the blue-red ratio according to the signals from said first light measuring circuit and said third light measuring circuit, a third operation circuit for calculating a signal corresponding to a green-red ratio according to the signals from said first light measuring circuit and said second light measuring circuit, and a fourth operation circuit for calculating a signal corresponding to the color compensating factor in response to the signals from said first operation circuit and said third operation circuit.

4. A color meter described in accordance with claim 1, wherein a selection apparatus is provided and said light balancing factor or said color compensating factor is displayed, by said display apparatus, in response to the signal from the selection apparatus.

5. A color meter described in accordance with claim 1, wherein said processing circuit has a microcomputer.

6. In a color intensity apparatus including a first means for detecting the intensity of red light, a second means for determining the intensity of green light, and a third means for determining the color intensity of blue light emanating from a scene, the improvement therein comprising:
   means for selecting the color temperature parameter of the image capturing member to be used for capturing the image of the scene;
   means responsive to signals from said first, second and third means and a signal from said color temperature selecting means for providing a factor determinative of the type of color correcting filter to be used in conjunction with the selected parameter of the image capturing member and
   means for displaying said color correcting filter factor.

7. The improved color intensity apparatus of claim 6 wherein said providing means comprises:
   means responsive to signals from said first means, said third means and said color temperature selecting means for providing a light balancing factor that determines the type of light balancing filter to be used, and
   means responsive to signals from said first means, said second means, and said third means for providing a color compensating factor that determines the type of color compensating filter to be used with said light balancing filter.

8. The improved color intensity apparatus of claim 7 wherein said light balancing factor providing means comprises:
   means for providing the ratio of blue light intensity to red light intensity being detected, and
   means for subtracting the signal representing the color temperature parameter therefrom.

9. The improved color intensity apparatus of claim 8 wherein said color compensating factor providing means comprises:
   means for providing the ratio of green light intensity to red light intensity, and
   means for subtracting the signal representing the ratio of blue light intensity to red light intensity therefrom.

10. The improved color intensity apparatus of claim 9 further comprising:
 means for providing the color temperature of the ratio of said blue light intensity to said red light intensity;
 means for providing the color temperature of the ratio of said green light intensity to said red light intensity, and
 means for displaying the blue-red ratio color temperature and the green-red ratio color temperature.

11. The improved color intensity apparatus of claim 10 further comprising means for visually indicating that said blue-red color temperature cannot be determined for lack of intensity of the detected light.

12. The improved color intensity apparatus of claim 10 further comprising means for visually indicating that said green-red color temperature cannot be determined for lack of intensity of the detected light.

13. The improved color intensity apparatus of claim 6 further comprising means for visually indicating that said provided factor may be unreliable due to the intensity of the light detected.

14. The improved color intensity apparatus of claim 6 wherein said color temperature selecting means comprises means for manually selecting a film color temperature constant.

15. The improved color intensity apparatus of claim 6 wherein said color temperature selecting means comprises means for manually selecting a color temperature variable as desired.

16. The improved color intensity apparatus of claim 15 wherein said manual selecting means comprises:
 means for displaying the color temperature stored in said color intensity apparatus;
 means responsive to a first manual manipulative color temperature stored in said color intensity apparatus and being displayed, and stopping such increase in response to a second manual manipulation, and
 means responsive to a third manual manipulation for decreasing the color temperature stored in said color intensity apparatus and being displayed, and stopping such decrease in response to a fourth manual manipulation.

* * * * *